United States Patent [19]

Boedecker et al.

[11] Patent Number: 4,883,913

[45] Date of Patent: Nov. 28, 1989

[54] STABILIZATION OF CHLOROFLUOROALKANES

[75] Inventors: Manfred Boedecker; Thomas Benecke; Werner Krücke, all of Hannover; Willi Baumeister, Meinersen, all of Fed. Rep. of Germany

[73] Assignee: Kali-Chemie Aktiengesellschaft, Hannover, Fed. Rep. of Germany

[21] Appl. No.: 241,468

[22] Filed: Sep. 8, 1988

[30] Foreign Application Priority Data

Sep. 9, 1987 [DE] Fed. Rep. of Germany ....... 3730221

[51] Int. Cl.4 ............................................. C07C 85/26
[52] U.S. Cl. ........................................................ 564/2
[58] Field of Search ............................................ 564/2

[56] References Cited

U.S. PATENT DOCUMENTS

| 3,352,789 | 11/1967 | Degginger et al. | 252/171 |
| 3,465,052 | 9/1969 | Okamura | 260/652.5 |
| 4,463,189 | 7/1984 | Hoffmann et al. | 564/2 |

FOREIGN PATENT DOCUMENTS 1207626 12/1965 Fed. Rep. of Germany .......... 564/2

Primary Examiner—Glennon H. Hollrah
Assistant Examiner—Mark W. Russell
Attorney, Agent, or Firm—Foley & Lardner, Schwartz, Jeffery, Schwaab, Mack, Blumenthal & Evans

[57] ABSTRACT

A method of stabilizing a composition comprising a chlorofluoroalkane and an amine or amine-based polyol comprising incorporating into said composition an effective stabilization promoting amount of at least one but-3-en-1-ol compound and compositions comprising at least one chlorofluoroalkane and a stabilization promoting but-3-en-1-ol.

20 Claims, No Drawings

STABILIZATION OF CHLOROFLUOROALKANES

BACKGROUND OF THE INVENTION

The present invention relates to the use of unsaturated organic compounds for the stabilization of compositions which contain chlorofluoroalkanes and amines and/or polyols containing amino groups, and which, for example, are used for the production of polyurethane foams, a process for the stabilization of such compositions, the compositions themselves and stabilizer-containing chlorofluoroalkanes.

In the production of polyurethane foams, isocyanates are reacted with multivalent alcohols to form high molecular weight polymers which contain the polyurethane linkage. If foamed polymers are desired, a blowing agent, often a chlorofluoroalkane, is added to the isocyanate or the multivalent alcohol (polyol) or both. The blowing agent is evaporated by the heat of reaction resulting during polymerization and thus a foamed product of low density is obtained.

If the compounds needed for the production of polyurethane foams are mixed together immediately before the reaction, a foam material with good properties can easily be produced. For practical reasons, often only the diisocyanate components are stored separately until foaming. All other components required for the production of foam material, such as catalysts, e.g., amine catalysts, emulsifying agents and the blowing agent or blowing agent mixture are pre-mixed with the polyol. These pre-mixtures have to be storable for long periods before use, without a reaction or decomposition occurring which would adversely affect the quality of the foam material produced.

However, this procedure only works well with non-amine polyols, i.e., polyols which only contain carbon, hydrogen and oxygen as elements, provided that the pre-formulated compositions are not subjected to extreme temperatures during storage. In the case of amines (including aminoalcohols) and the case of polyols based on amines, i.e., polyols which contain nitrogen in addition to the stated elements carbon, hydrogen and oxygen, and which represent, e.g., amine or alkanolaminestarted polyethers with free hydroxyl groups, however, a reaction takes place between the amine or the amine-based polyol on the one hand and the chlorofluoroalkanes used as blowing agents on the other hand. This leads to the formation of hydrochloric acid which results in a decrease in the pH value and an accompanying decrease in the storage stability of the liquid compositions. Furthermore, the solution becomes darker, its viscosity increases, and only poor quality foam materials can be produced, or the compositions even become unusable for producing foamed materials.

It is known from West German Pat. No. DE 1 207 626 that unsaturated compounds ——such as butadiene, isoprene, styrene, α-methylstyrene or 1-alkenes with 4 to 18 carbon atoms ——can be added as stabilizers to these compositions which contain amine-based polyols as well as chlorofluoroalkanes; whereas unsaturated oxygen-containing compounds such as vinyl acetate or methyl vinylketones are described as ineffective for the same purposes.

U.S. Pat. No. 3,352,789 discloses that in addition to α-methylstyrene, anethole (=1-(p-methoxyphenyl)propene-1), m-diisopropenylbenzene, 1,3,5-triisopropenylbenzene and 1-(p-methoxyphenyl)-2-nitropropene-1 can be used for stabilization.

Furthermore, U.S. Pat. No. 3,465,052 describes the use of p-isopropenyl-toluene (p-methyl-α-methylstyrene), and U.S. Pat. No. 4,463,189 describes the use of an isomeric mixture of 2,4-diphenyl-4-methyl-pentenes ("dimeric αmethylstyrene") to inhibit the reaction of the amines, the aminoalcohols or the polyol containing amino groups with the chlorofluoroalkane.

It is thereby disadvantageous that the aforementioned compounds fulfill their stabilizing function only for relatively short storage periods and even then in some cases unsatisfactorily. If a certain storage period is exceeded, reactions increasingly start to occur between the amine or the amine-based polyol and the chlorofluoroalkane. Just as with non-stabilized compositions, these reactions lead to a lowering of the pH value through the formation of hydrochloric acid and to an increase in viscosity. The compositions change their color, and become cloudy and also less reactive due to precipitation of hydrochlorides. Such aged compositions exhibit prolonged starting times on foaming, prolonged setting times and prolonged times for becoming free of tackiness. In addition they lead to poor quality foamed materials, i.e., dark-colored foamed materials with non-uniform cells which are often too large, or they even can no longer be used for the production of foamed materials.

A further drawback is that metals which are present may catalyze and accelerate the ageing process, which additionally reduces the maximum storage time upon usual storage of the pre-produced polyol compositions in steel plate containers or metal drums. In this case the corrosion of the containers, which is enhanced by the ageing of the compositions, causes additional problems.

SUMMARY OF THE INVENTION

It is the object of the present invention to provide a method of stabilizing compositions comprising chlorofluoroalkanes and amines and/or polyols containing amino groups which overcomes the disadvantages of the prior art.

A further object of the present invention is to provide compositions comprising chlorofluoroalkanes and amines and/or polyols containing amino groups which exhibit improved storage stability.

Another object of the present invention is to provide compositions containing chlorofluorocarbons which can be used as blowing agents to produce foamed materials with good properties even after prolonged storage prior to their use.

A particular object is to provide better stabilized compositions comprising chlorofluoroalkanes and amines (including aminoalcohols) and/or polyols containing amino groups which are suitable as premix for the production of high quality foamed material.

These and other objects of the invention are achieved by providing a method of stabilizing a composition comprising at least one chlorofluoroalkane and an amine or a polyol containing amino groups, said method comprising incorporating into said composition an effective stabilization promoting amount of a but-3-en-1-ol compound corresponding to the formula:

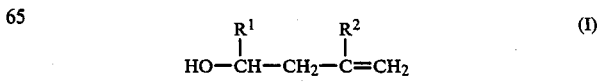

wherein $R^1$ and $R^2$ each individually represent hydrogen, a straight-chain or branched $C_1$ to $C_4$ alkyl group, a phenyl group or a substituted phenyl group. A particularly preferred but-3-en-1-ol compound is 3-methylbut-3-en-1-ol.

DETAILED DESCRIPTION OF PREFERRED EMBODIMENTS

It has now been found that by using but-3-en-1-ol compounds, an advantageous stabilizing effect is achieved.

According to the invention, but-3-en-1-ols corresponding to the following Formula I are used for stabilizing compositions comprising chlorofluoroalkanes and amines, including the aminoalcohols, and/or polyols containing amino groups.

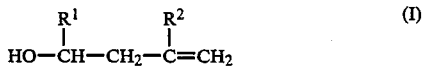

The effective structural feature in compounds of Formula I is the combination of a terminal double bond with a hydroxyl group placed in the β-position relative to this double bond.

In the Formula I, $R^1$ and $R^2$, which may be the same or different, represent hydrogen, a straight-chain or branched $C_1$ to $C_4$ alkyl residue, the phenyl residue or a phenyl residue substituted by lower alkyl, lower alkenyl and/or lower alkoxy groups, i.e. those containing up to 4 carbon atoms.

Preferably $R^1$ is hydrogen. $R^2$ may then be hydrogen, methyl, ethyl, propyl, butyl or phenyl, e.g., also methoxy-substituted or isopropenyl-substituted phenyl. The compounds wherein $R^1$ is hydrogen are, e.g., but-3-en-1-ol, 3-methylbut-3-en1-ol, 3-ethylbut-3-en-1-ol, 3-propylbut-3-en-1-ol, 3-butylbut-3-en-1-ol or 3-phenylbut-3-en-1-ols.

Preferably $R^2$ is methyl. $R^1$ may then be hydrogen, methyl, ethyl, propyl, butyl or phenyl, e.g., also methoxy-substituted or isopropenyl-substituted phenyl. Compounds in which $R^2$ is methyl include, for example, 3-methylbut-3-en-1-ol, 4-methylpent-4-en-2-ol, 5-methylhex-5-en-3-ol, 2-methylhept-1-en-4-ol, 2-methyloct-1-en-4-ol or 1-phenyl-3-methylbut-3-en-1-ols.

In an especially preferred embodiment, $R^1$ is hydrogen and $R^2$ is methyl. The compound used is then 3-methylbut-3-en-1-ol.

The compounds of the general Formula I are used according to the invention for stabilizing compositions comprising chlorofluoroalkanes and amines, including the aminoalcohols and/or polyols containing amino groups. The stabilizers according to the invention are advantageously used in quantities of 0.05 to 5% weight, preferably 0.3 to 1.5% weight relative to the chlorofluoroalkane. In an example of the invention, the weight proportion, e.g., of 3-methylbut-3-en-1-ol is 0.75% by weight relative to the chlorofluoroalkane.

Chlorofluoroalkanes within the scope of the invention are halocarbon compounds known as blowing agents, e.g., perhalogenated $C_1$ to $C_2$- alkanes, particularly trichlorofluoromethane, 1,1,2-trichloro-1,2,2-trifluoroethane, 1,1,1-trichloro-2,2,2-trifluoroethane, tetrachloro-1,2-difluoroethane, tetrachloro-2,2-difluoroethane and mixtures of two or more of these compounds. Trichlorofluoromethane is particularly suitable.

As amines within the scope of the present invention, known amine catalysts for the reaction of isocyanate groups with hydroxyl groups can be used, such as saturated or unsaturated aliphatic, cycloaliphatic or heterocyclic amines. Examples include triethylamine, methylbis-dimethylaminoethylamine, N,N,N',N'-tetramethylethylenediamine, triethylenediamine, dimethylcyclohexylamine, N,N,N',N'-tetramethyl-1,3-butanediamine, 1,1,3,3-tetramethylguanidine, 1,2,4-trimethylpiperazine, N-cyclohexylpiperidine, 4-dimethylaminopyridine, N-methylmorpholine or morpholine.

Furthermore other conventional amines, such as N-ethylmorpholine, N,N'-dimethylbenzylamine, N,N-dimethyl-(N,N'-dimethylamino)piperazine, N,N-dimethylpiperazine, hexadecyldimethylamine, diethylcyclohexylamine, or N-phenylcyclohexylamine can also be used.

In addition, known amino alcohols, e.g., dimethylethanolamine, diethanolamine, N-methyldiethanolamine, triethanolamine, diisopropanolamine or N,N,N',N'-tetrakis(2-hydroxypropyl)ethylenediamine, may be used as amines within the scope of the invention. Or else other conventional aminoalcohols, such as diethylethanolamine or 1,4-bis-(2-hydroxypropyl)-2-methylpiperazine may also be used.

Polyols containing amino groups within the scope of the invention are understood to be polyethers started with amines, alkanolamines or aromatic amines with a remaining content of hydroxyl groups. Such polyols based on amines may be, for example, reaction products of ethylene oxide and/or propylene oxide with an amine such as, e.g., diethylene triamine, ethylene diamine, triethanolamine or toluene diamine. It will be understood that in addition to the aforementioned polyol systems, other conventionally used polyols may also be used within the scope of the invention. Suitably, an amine-based polyol with a hydroxyl number of 485 to 515 is used.

The invention also comprises a method for stabilizing compositions comprising chlorofluoroalkanes and amines, including aminoalcohols, and/or polyols containing amino groups. In this case, 0.05 to 5% weight of a compound of Formula (I) is incorporated into the composition. In one example of the present invention, 0.75% weight 3-methylbut-3 en-1-ol is added, the proportions by weight of the stabilizers being relative to the chlorofluoroalkane.

Furthermore, the invention pertains to compositions which comprise a chlorofluoroalkane, amines including the aminoalcohols, and/or polyols containing amino groups and a compound of Formula (I) as a stabilizer. In a preferred example of the compositions according to the invention, 3-methyl-but-3-en-1-ol is contained as the stabilizing compound.

Moreover, the invention also pertains to chlorofluoroalkanes or mixtures thereof which comprise a compound of Formula (I) in a quantity sufficient to stabilize compositions comprising chlorofluoroalkanes and amines, including aminoalcohols and/or polyols containing amino groups.

The compositions according to the invention, which are stabilized by compounds of the general Formula (I), have advantageous properties. The compositions are stable over very long periods of time, i.e., the pH value and the viscosity of the compositions change only slightly. This is true even in the presence of boiler steel and is particularly important because it is conventional to store such compositions in steel plate containers or metal drums. The compositions according to the invention exhibit superior stability and storage properties compared to compositions stabilized with the conventionally used compounds of the prior art. Furthermore, they prove to be surprisingly well suited for the production of high quality foamed materials.

To demonstrate the superiority of the compounds used as stabilizers according to the invention, the effect of the 3-methylbut-3-en-1-ol was compared with that of the "dimeric α-methylstyrene" (disclosed in U.S. Pat. No. 4,463,189), as explained in greater detail in the Examples.

The following Examples are intended to illustrate the invention in further detail without limiting its scope.

The following composition I (comprising 3-methylbut-3-en-1-ol) according to the invention and the following comparison composition II (comprising "dimeric α-methylstyrene") were used for the following tests:

| Composition No. | | I | II |
|---|---|---|---|
| amine-based polyether | (% wt.) | 100.0 | 100.0 |
| polysiloxane (Si copolymer) | (% wt.) | 0.8 | 0.8 |
| dimethylcyclohexyl-amine | (% wt.) | 2.0 | 2.0 |
| water | (% wt.) | 1.0 | 1.0 |
| trichlorofluoro-methane stabilized with 0.75% wt. dim α-methylstyrene | | — | 30.0 |
| trichlorofluoromethane stabilized with 0.75% wt. 3-methylbut-3-en-1-ol | (% wt.) | 30.0 | — |

The compositions were first stored in glass containers in the presence of boiler steel at +50° C. for 8 weeks and then characterized by determination of the parameters listed in the following Table. The storage of the compositions for 8 weeks at +50° C. in this case corresponds to a storage time of about 10 months at 20° C.

| | Time (weeks) | Composition No. | |
|---|---|---|---|
| | | I | II |
| pH value | 0 | 10.8 | 10.9 |
| | 8 | 9.2 | 8.5 |
| viscosity (mPa s) | 0 | 128 | 120 |
| | 8 | 138 | 169 |
| starting time (s) | 0 | 17 | 17 |
| | 8 | 17 | 30 |
| setting time (s) | 0 | 75 | 80 |
| | 8 | 85 | 135 |
| time for becoming free of tackiness (s) | 0 | 110 | 115 |
| | 8 | 110 | 180 |

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A method of stabilizing a composition comprising at least one chlorofluoroalkane and an amine or a polyol containing amino groups, said method comprising incorporating into said composition an effective stabilization promoting amount of a but-3-en-1-ol compound corresponding to the formula:

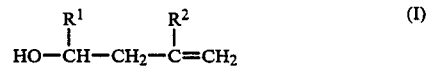

$$HO-\underset{\underset{R^1}{|}}{CH}-CH_2-\underset{\underset{R^2}{|}}{C}=CH_2 \quad (I)$$

wherein $R^1$ and $R^2$ each individually represent hydrogen, a straight-chain or branched $C_1$ to $C_4$ alkyl group, a phenyl group or a substituted phenyl group.

2. A method according to claim 1, wherein said but-3-en-1-ol compound is 3-methylbut-3-en-1-ol.

3. A method according to claim 1, wherein said but-3-en-1-ol compound is incorporated into said composition in an amount of from 0.05 to 5% by weight relative to the chlorofluoroalkane.

4. A method according to claim 3, wherein said but-3-en-1-ol compound is incorporated into said composition in an amount of from 0.3 to 1.5% by weight relative to the chlorofluoroalkane.

5. A method according to claim 1, wherein said amine is an amine catalyst for the reaction of isocyanate groups with hydroxyl groups to form urethane linkages.

6. A method according to claim 5, wherein said amine catalyst is selected from the group consisting of saturated and unsaturated aliphatic, cycloaliphatic or heterocyclic amines.

7. A method according to claim 6, wherein said amine catalyst is selected from the group consisting of triethylamine, methyl-bis-dimethylaminoethylamine, N,N,N',N'-tetramethylethylenediamine, triethylenediamine, dimethylcyclohexylamine, N,N,N',N'-tetramethyl-1,3-butanediamine, 1,1,3,3-tetramethylguanidine, 1,2,4-trimethylpiperazine, N-cyclohexylpiperidine, 4-dimethylaminopyridine, N-methylmorpholine and morpholine.

8. A method according to claim 5, wherein said amine is an aminoalcohol.

9. A method according to claim 8, wherein said aminoalcohol is selected from the group consisting of dimethylethanolamine, diethanolamine, N-methyldiethanolamine, triethanolamine, diisopropanolamine and N,N,N',N'-tetrakis(2-hydroxypropyl)ethylenediamine.

10. A method according to claim 1, wherein said polyol containing amino groups is an amine or alkanolamine-started polyether with a remaining content of hydroxyl groups.

11. A method according to claim 1, wherein said at least one chlorofluoroalkane is selected from the group consisting of
1,1,2-trichloro-1,2,2-trifluoroethane,
1,1,1-trichloro-2,2,2-trifluoroethane,
tetrachloro-1,2-difluoroethane,
tetrachloro-2,2-difluoroethane, and
trichlorofluoromethane.

12. A composition of matter comprising at least one chlorofluoroalkane, at least one compound selected from the group consisting of amines and polyols containing amino groups, and an effective stabilization promoting amount of a stabilizing compound corresponding to the formula:

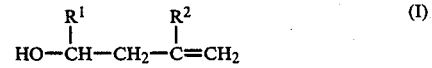

$$HO-\underset{\underset{R^1}{|}}{CH}-CH_2-\underset{\underset{R^2}{|}}{C}=CH_2 \quad (I)$$

wherein $R^1$ and $R^2$ each individually represent hydrogen, a straight-chain or branched $C_1$ to $C_4$ alkyl group, a phenyl group or a substituted phenyl group.

13. A composition according to claim 12, wherein said stabilizing compound is 3-methylbut-3-en-1-ol.

14. A composition according to claim 12, comprising from 0.05 to 5% by weight of said stabilizing compound relative to the chlorofluoroalkane.

15. A composition according to claim 14, comprising from 0.3 to 1.5% by weight of said stabilizing compound relative to the chlorofluoroalkane.

16. A composition of matter comprising at least one chlorofluoroalkane and an amount of a stabilizing compound corresponding to the formula:

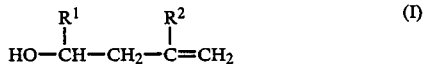

(I)

wherein $R^1$ and $R^2$ each individually represent hydrogen, a straight-chain or branched $C_1$ to $C_4$ alkyl group, a phenyl group or a substituted phenyl group, effective to stabilize said chlorofluoroalkane in the presence of an amine or amine-based polyol.

17. A composition according to claim 16, wherein said at least one chlorofluoroalkane is selected from the group consisting of
1,2-trichloro-1,2,2-trifluoroethane,
1,1,1-trichloro-2,2,2-trifluoroethane,
tetrachloro-1,2-difluoroethane,
tetrachloro-2,2-difluoroethane, and
trichlorofluoromethane.

18. A composition according to claim 16, wherein said stabilizing compound is 3-methylbut-3-en-1-ol.

19. A composition according to claim 16, comprising from 0.05 to 5% by weight of said stabilizing compound relative to the chlorofluoroalkane.

20. A composition according to claim 16, comprising from 0.3 to 1.5% by weight of said stabilizing compound relative to the chlorofluoroalkane.

* * * * *